US010668666B2

(12) United States Patent
Morovic et al.

(10) Patent No.: US 10,668,666 B2
(45) Date of Patent: Jun. 2, 2020

(54) COLOR MAPPING IN 3D PRINTING

(71) Applicant: Hewlett-Packard Development Company, L.P., Houston, TX (US)

(72) Inventors: Peter Morovic, Barcelona (ES); Jan Morovic, Colchester (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 47 days.

(21) Appl. No.: 15/746,759

(22) PCT Filed: Oct. 29, 2015

(86) PCT No.: PCT/EP2015/075169
§ 371 (c)(1),
(2) Date: Jan. 22, 2018

(87) PCT Pub. No.: WO2017/071764
PCT Pub. Date: May 4, 2017

(65) Prior Publication Data
US 2019/0009473 A1 Jan. 10, 2019

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/165* (2017.08); *B29C 67/00* (2013.01);
(Continued)

(58) Field of Classification Search
CPC ..... B29C 64/393; B29C 64/165; B29C 67/00; B33Y 10/00; B33Y 50/00; B33Y 50/02; G06T 17/00; H04N 1/60
See application file for complete search history.

(56) References Cited

U.S. PATENT DOCUMENTS 4,457,961 A * 7/1984 Nakazawa ............ B65D 35/02
215/12.2
6,652,256 B2 11/2003 Coe
(Continued)

OTHER PUBLICATIONS

Stanic, et al., "Color and permanence issues in 3D ink-jet printing", MIPRO 2010, Proceedings of the 33rd International Convention, IEEE, Piscataway, NJ, USA, May 24-28, 2010, Opatija, Croatia, pp. 274-277. http://ieeexplore.ieee.org/xpl/articleDetails.jsp?tp=&arnumber=5533338&queryText%3Dcolor+layer+3D+printing.
(Continued)

*Primary Examiner* — Thomas C Lee
*Assistant Examiner* — Michael Tang
(74) *Attorney, Agent, or Firm* — HP Inc. Patent Department

(57) ABSTRACT

In some examples, a plurality of print material combinations for object generation are determined, each print material combination having an associated color. A plurality of color descriptions may be determined, the color descriptions corresponding to a combination of voxels, each of the voxels of the combination of voxels having a defined print material combination and a defined depth with respect to a surface. A color mapping resource may be defined, the color mapping resource associating a color description with a print instruction, each print instruction being for use in causing an object generation apparatus to generate the combination of voxels corresponding to the associated color description.

15 Claims, 3 Drawing Sheets

(51) Int. Cl.
  *B29C 67/00* (2017.01)
  *B33Y 50/00* (2015.01)
  *B29C 64/165* (2017.01)
  *H04N 1/60* (2006.01)
  *B33Y 50/02* (2015.01)
  *G06T 17/00* (2006.01)

(52) U.S. Cl.
  CPC ............... *B33Y 10/00* (2014.12); *B33Y 50/00* (2014.12); *B33Y 50/02* (2014.12); *G06T 17/00* (2013.01); *H04N 1/60* (2013.01)

(56) References Cited

U.S. PATENT DOCUMENTS

| | | |
|---|---|---|
| 9,020,627 B2 | 4/2015 | Kritchman |
| 10,279,545 B2 * | 5/2019 | Urban .................... G06T 19/20 |
| 2004/0080078 A1 | 4/2004 | Collins |
| 2014/0277661 A1 | 9/2014 | Amadio et al. |
| 2015/0258770 A1 * | 9/2015 | Chan .................... B33Y 50/02 700/98 |
| 2016/0236416 A1 * | 8/2016 | Bheda .................. B29C 64/386 |

OTHER PUBLICATIONS

International Search Report and Written Opinion dated Jul. 19, 2016, PCT Patent Application No. PCT/EP2015/075169, filed Oct. 29, 2015, European Patent Office.

* cited by examiner

COLOR MAPPING IN 3D PRINTING

CLAIM FOR PRIORITY

The present application is a national stage filing under 35 U.S.C. § 371 of PCT application number PCT/EP2015/075169, having an international filing date of Oct. 29, 2015, the disclosure of which is hereby incorporated by reference in its entirety.

BACKGROUND

Three-dimensional objects generated by an additive manufacturing process may be formed in a layer-by-layer manner. In one example of additive manufacturing, an object is generated by solidifying portions of layers of build material. In examples, the build material may be in the form of a powder, fluid or sheet material. The intended solidification and/or physical properties may be achieved by printing an agent onto a layer of the build material. Energy may be applied to the layer and the build material on which an agent has been applied may coalesce and solidify upon cooling. In other examples, chemical binding agents may be used to solidify a build material. In other examples, three-dimensional objects may be generated by using extruded plastics or sprayed materials as build materials, which solidify to form an object.

Some printing processes that generate three-dimensional objects use data generated from a model of a three-dimensional object. This data may, for example, specify the locations at which to apply an agent to the build material, or where a build material itself may be placed, and the amounts to be placed. The data may be generated from a three-dimensional representation of an object to be printed.

BRIEF DESCRIPTION OF DRAWINGS

Examples will now be described, by way of non-limiting example, with reference to the accompanying drawings, in which.

DETAILED DESCRIPTION

Figure 1:
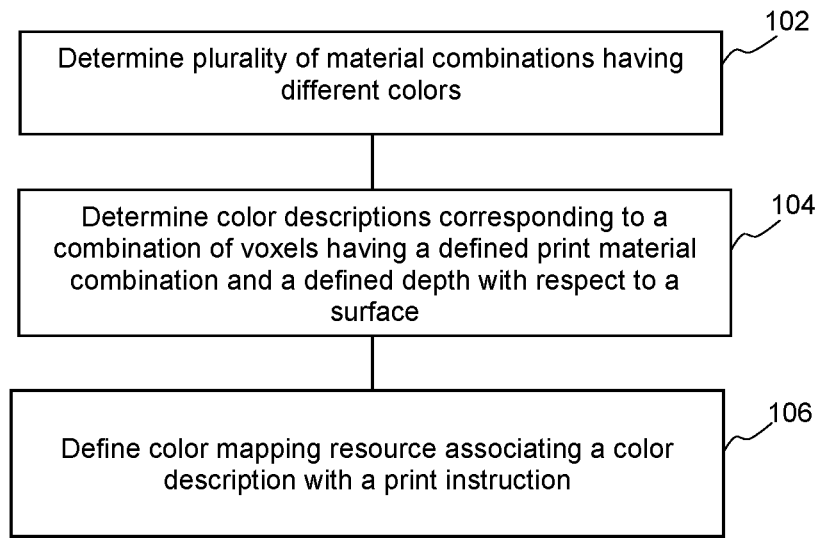
FIG. 1 is a flow chart of an example of a method for defining a color mapping resource.

Some examples described herein provide an apparatus and a method for processing data relating to a three-dimensional object and/or for generating data that may be used, for example by a three-dimensional printing system, or in object generation apparatus, to produce a three-dimensional object. In some examples, data describing three-dimensional content with a variety of specified object properties is processed. These object properties may comprise appearance properties (color, transparency, glossiness, etc.), conductivity, density, porosity and/or mechanical properties such as strength.

In some examples herein, three-dimensional space is characterised in terms of 'voxels', i.e. three-dimensional pixels, wherein each voxel occupies or represents a discrete volume. In data modelling a three-dimensional object, a voxel at a given location may have at least one characteristic. For example, it may be empty, may have a particular color and/or may represent a particular material, or a particular object property, or the like. The voxels of an object may have the same shape (for example, cubic or tetrahedral), or may differ in shape and/or size.

In some examples, a print material coverage representation defines print material data, for example detailing the amount of print materials (such as agent(s) to be deposited onto a layer of build material, or in some examples, build materials themselves), and, if applicable, their combinations. In some examples, this may be specified as a proportional volume coverage (for example, X% of a region of a layer of build material should have agent Y applied thereto). Such print materials may be related to or selected to provide at least one object property such as, for example, color, transparency, flexibility, elasticity, rigidity, surface roughness, porosity, conductivity, inter-layer strength, density, and the like.

The actual location at which each print material (for example, a drop of an agent) should be applied, as specified in control data, may be determined using halftoning techniques.

For example, a set of voxels within object model data may have an associated print material coverage representation comprising a set of print material volume coverage (Mvoc) vectors. In a simple case, such a vector may indicate that X% of a given region of three-dimensional space should have a particular agent applied thereto, whereas (100-X)% should be left clear of agent. This may define a probability distribution for a given material. In some examples, the material coverage representation may comprise a description of the coverage of a particular material. The print material coverage representation may then provide the input for a 'halftoning' process to generate control data that may be used by object generation apparatus to generate a three-dimensional object. For example, it may be determined that, to produce specified object properties, 25% of a layer of build material (or of a portion of a layer) should have an agent applied thereto. The halftoning process determines where the drops of agent fall in order to provide 25% coverage, for example by comparing each location to a threshold value provided in a halftone threshold matrix.

FIG. 1 is an example of a method of defining a color mapping resource. The method comprises, in block 102, determining a plurality of print material combinations for object generation, each print material combination having an associated color. For example, the materials may comprise build materials, print agents, or the like. In some examples, the material combinations may be for object generation by an object generation apparatus, which may be a particular object generation apparatus, or an apparatus in a particular state (for example, indicating if there are reserves of a particular print material). In some examples, an object generation apparatus may be at least one class or type of object generation apparatus. In some examples, the print material combinations may comprise anticipated materials or print material combinations, or anticipated common materials or print material combinations which may be available at any (e.g. an arbitrary) object generation apparatus. In some examples, object generation may be carried out using an additive manufacturing process.

In block 104, a plurality of color descriptions are determined, the color descriptions corresponding to a combination of voxels, each of the voxels of the combination of voxels having a defined print material combination and a defined depth with respect to a surface. The combination may comprise a surface voxel and at least one subsurface, or interior, voxel. As detailed above, a voxel is, or represents, a region of three-dimensional space. If a surface voxel is at least partially transparent, the appearance of an interior voxel may have an impact on the appearance of the object. Therefore, combinations of voxels, where the constituent voxels of the combinations vary between combinations, may result in different color descriptions. This in turn may expand the color gamut of an object generation apparatus. Instead of being confined to the colors achievable in individual voxels, combinations of voxels may be considered, giving a greater range of color options. It may be that the number of layers of voxels in a combination is predetermined (and that voxels of deeper layers are not considered in combinations). The number of layers may in some examples reflect the depth of in voxels to which an interior voxel has an impact (or a significant impact) on the external appearance. In some examples, the opacity of shallower voxels may be considered when determining a number of layers of voxels to be considered in a combination.

In some examples, block 104 may comprise generating three-dimensional objects having a combinations of voxels, and determining color descriptions by measurement, for example colorimetric measurement, of such objects. In other examples, stored data characterising the colorimetry of combinations of voxels could be used, or color descriptions may be determined based on color theory, the transparency of voxels and the like, or interpolated between previously determined relationships between combinations of voxels and color descriptions.

In block 106, a color mapping resource, which may be for use by three-dimensional object generation apparatus, is defined. The color mapping resource associates a color description with a print instruction, each print instruction being to cause an object generation apparatus to generate the combination of voxels corresponding to the associated color description. In some examples, the color mapping resource may be a look up table, or a database, or the like. The print instruction may comprise control data, for example for generating an object, or may provide a basis for the generation of control data.

Figure 2:
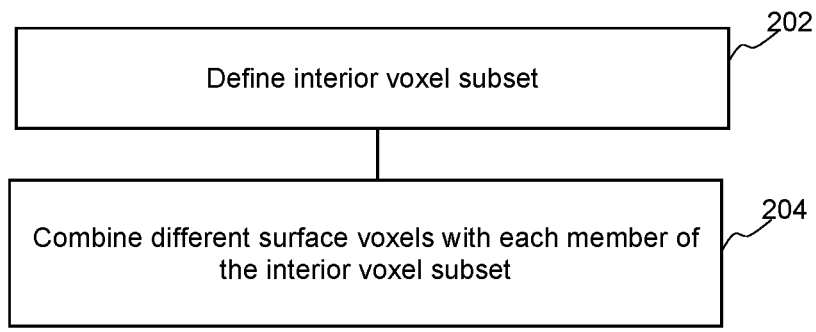
FIG. 2 is a flow chart of an example of a method for determining a subset of combinations of voxels.

FIG. 2 shows an example of a method of determining a plurality of color descriptions in which a subset of the possible combinations of voxels is considered. In this example, combinations which comprise voxels having predetermined color parameters may be selected.

In block 202, an interior (i.e. subsurface) voxel subset is defined. Each member of the subset comprises at least one voxel. The subset is smaller than the possible set of voxels. By reducing the size of the set of interior voxels to a subset, fewer color descriptions and/or mappings may be determined or stored thus reducing processing or memory storage.

In examples, this subset may be selected as a subset of interior voxels in which the voxel, some or all voxel(s) of each member of subset of interior voxel have a predetermined color parameter. For example, the subset may comprise those voxels or combinations of voxels which are achromatic, i.e. comprise black, white or grey print material combinations. In some examples, a subset of achromatic voxels, for example, black and white, but not grey voxels, are considered. Specifying the interior voxels as being achromatic (while the surface voxel may be chromatic) may considerably extend the color gamut available with a particular combination of print materials while being simple to implement. In some examples, the lightness range may be extended, which may in turn improve the contrast capability and/or rendering of textures or other surface details, which are often effected by differences in lightness. By selecting those combinations of subsurface pixels which are achromatic, the number of combinations of possible pixels to evaluate is reduced, with corresponding reductions in processing and/or memory storage.

In some examples, the members of the subset, or in some examples, the, some or all of the voxels within a subset may have a particular (for example, a common) color parameter, such as hue, color gamut regions (e.g. light or dark), saturation, or the like. Color gamut region, for example, may be determined by lightness: for example, a color description which relates to the darker half of a color gamut may be more readily reproduced with an interior voxel or voxel combination from the same half of the gamut, and similarly for a color description which relates to the lighter half. In some examples, a set of color descriptions may be at least partially predetermined, and combinations of voxels representing those color descriptions may be specifically sought. For example, it may be intended that a gamut, or region thereof, may effectively be populated by combinations of voxels. In such examples, the members of the subset, or in some examples, the, some or all of the voxels within a member may have a common color parameter with the color description.

In block 204, surface voxels are combined with each member of the interior voxel subset. This may be carried out for each of a range of colors of surface voxels.

In some examples, the surface voxel may be selected to have a predetermined color parameter. In some examples, this may be a parameter in common with the color of the color description. The common parameter may be hue: for example, for one of a set of combinations of voxels which are associated with a color description indicating that they are 'red', the interior voxels may comprise white, grey or black voxels and the surface voxel for members of the set may comprise one of a set of print material combinations which result in red colors. In other examples, the parameter in common may be color gamut region, for example as determined by lightness as mentioned above. In other examples, the parameter in common may be saturation, e.g. a surface voxel may be selected to have a saturation corresponding to, or within a range of, an intended saturation for that combination of voxels.

By considering a subset of voxel combinations, rather than the full set, the number of combinations to be evaluated is reduced, easing processing burden and/or memory storage. As noted above, membership of the subset may be determined based on a color parameter. In other examples, membership of a subset may be determined based on color theories or models. For example, it is likely that underpainting black with a color will not result in a more efficient or more colorful dark colorimetry than underpainting a color voxel with black, and therefore, the color descriptions for combinations having a black surface voxel and color interior voxel(s) may not be determined. As another example, if a color description is intended to lie in the darker far reaches of a color gamut, it is likely that the combination will include at least some black, whereas in the lighter far reaches, it will have at least some white, but not vice versa. This again allows some combinations of voxels to be deselected from a subset in some examples.

In some examples, as briefly mentioned above, test objects using different print material combinations may be produced and measured. This could be carried out on a selective, and in some examples, iterative basis. In one example, the initial characterisation of a gamut of an object generation apparatus, which may be a particular object generation apparatus, or a class of apparatus, or the like, may comprise selecting regions, or initial regions, of the gamut. In one example, a set of objects or object portions having a light color as the surface voxel and a selection of different, or different combinations of, interior voxels. A similar set, but having a dark colored surface voxel, and further sets having high-chroma surface voxels may also be generated. In some examples, a set may be taken from the "hue ring" of a color gamut, i.e. the colors that at, each hue, have the highest chroma. From these sets of objects, the interior voxels (or combinations of interior voxels) which contribute the size of the gamut can be identified.

This may define a subset which may be used with other surface voxels in further characterisation of the gamut by producing test objects corresponding to different regions of the gamut. For example, those combinations of interior voxels which contributed to the color gamut over the tested regions may be generated when characterising other regions of the gamut, while other interior voxels/voxel combinations may not be included in generation of further test objects. In such examples, therefore, the subset is determined by selecting combinations of voxels in which a plurality of color descriptions have a common combination of interior voxels and/or by selecting combinations of voxels which contribute the size of the gamut.

The print material combinations for those combinations of voxels which contribute the size of the gamut may be selected for inclusion in a color mapping resource. The other combinations may be regarded as being interior to the convex hull of the gamut, i.e. they do not provide additional color choices, and, in some examples, may therefore be discarded.

In some examples, the gamut may be substantially characterised by testing, which may allow explicit mappings to be determined. In some examples, implicit mappings may be determined through interpolation.

Figure 3:
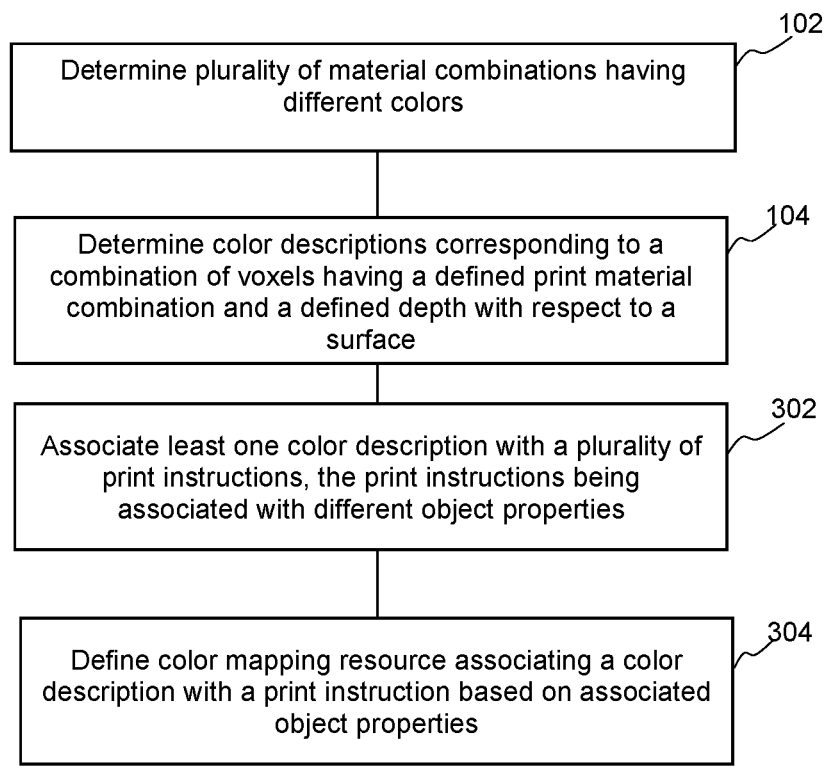
FIG. 3 is a flow chart of another example of a method for defining a color mapping resource.

FIG. 3 is an example of a method of defining a color mapping resource having the blocks 102 and 104 set out in FIG. 1. In block 302, at least one color description is associated with a plurality of print instructions, the print instructions being associated with different object properties. For example, as noted above, there may be cases where there is a plurality print material combination which result in a similar colorimetries. However, one such combination may be associated with a set of mechanical properties which, for example, is more likely to be useful in object generation (or, if a specific object is being considered, is more suited to that particular object). In some examples, some or all combinations may be maintained in a color mapping resource, and may for example be selected between at the point of object generation. However, in this example, in block 304, the print material combination associated with particular object properties, which may for example be properties which are considered favourable in three dimensional object generation, or in generation of at least one particular object, are included in the color mapping resource while other print material combinations are discarded.

In this example, the number of possible mappings included in the color mapping resource is reduced by discounting some print material combinations based on object properties. In some such examples, there may be a qualification threshold in relation to at least one parameter (e.g. a minimum strength, density or the like) or a combination of parameters for determining and/or storing a mapping. Such a qualification may apply whether or not there are similar colorimetries.

In some examples, a selection may be made between print material combinations which result in a similar appearance on an arbitrary basis. In some examples, print material combinations which use more, or more expensive, printing resources (for example, more print agent, or those which are associated with a higher energy use) may be discounted. Other parameters, or combinations of parameters, could be used for selection. Such methods could be combined with the method of FIG. 2 to ensure that the color mapping resource is not unduly large.

Figure 4:
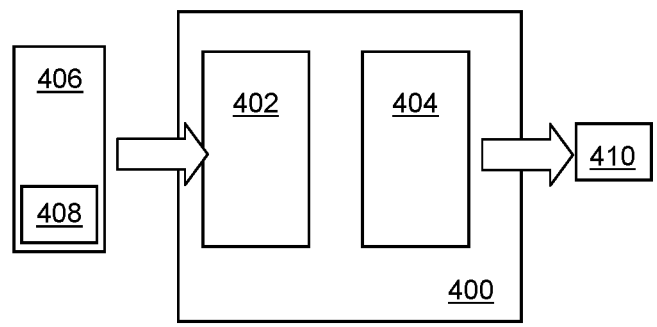
FIG. 4 is a simplified schematic of an example of processing apparatus for mapping object color descriptions to an object generation color descriptions.

FIG. 4 is an example of a processing apparatus 400 comprising an interface 402 and a color mapper 404.

The interface 402 is to receive data 406 representing a three-dimensional object, the data comprising at least one object color description 408. In some examples, the object color description 408 may specify at least one surface color, specifying an intended external appearance of at least a portion of the object. In some examples, the data 406 comprises an object color description 408 associated with each of a plurality of surface voxels within a geometric description of the object. In some examples, object property descriptions may be associated with each of a plurality of voxels. In some examples, the data 406 may for example comprise object model data and object property data. The object color description 408 may be provided as part of object property data. The object model data may define a three-dimensional geometric model of at least a portion of the model object, including the shape and extent of all or part of an object in a three-dimensional co-ordinate system, e.g. the solid portions of the object. The object model data may be generated by a computer aided design (CAD) application. Object property data may define at least one object property for the three-dimensional object to be generated. In one example, the object property data may comprise any or any combination of a color, flexibility, elasticity, rigidity, surface roughness, porosity, inter-layer strength, density, conductivity and the like for at least a portion of the object to be generated. The object property data may define multiple object properties for a portion or portions of an object. A given voxel may have associated data that indicates whether a portion of an object is present at that location. Object property data may comprise global and local object property data, e.g. certain object property values as defined in the object property data may be associated with each voxel that defines the object and/or certain object property values may be associated with a set of voxels, e.g. ranging from individual voxels to all voxels associated with the object. In one example, the data representing the three-dimensional object comprises a model of a three-dimensional object that has at least one object property specified at every location within the model, e.g. at every [x, y, z] co-ordinate.

The color mapper 404 maps the received object color description 408 to an object generation color description 410, the object generation color description 410 being associated with a predetermined combination of voxels, wherein each of the voxels is associated with a predetermined print material combination and a depth with respect to a surface of the object. The object generation color description 410 comprises at least one print instruction for use in causing an object generation apparatus to generate the combination of voxels.

In some examples the object generation color description 410 may comprise at least one volume coverage representation, for example at least one material volume coverage (Mvoc) vector. Each Mvoc may comprise a print instruction. An Mvoc vector may have a plurality of values, wherein each value defines a proportion for each, or each combination of print materials in an addressable location of a layer of the three-dimensional object. For example, in an object generation apparatus with two available print materials (for example, agents)—M1 and M2, where each print material may be independently deposited in an addressable area of a layer of the three-dimensional object, there may be $2^2$ (i.e. four) proportions in a given Mvoc vector: a first proportion for M1 without M2; a second proportion for M2 without M1; a third proportion for an over-deposit (i.e. a combination) of M1 and M2, e.g. M2 deposited over M1 or vice versa; and a fourth proportion for an absence of both M1 and M2. In this case an Mvoc vector may be: [M1, M2, M1M2, Z] or with example values [0.2, 0.2, 0.5, 0.1]—i.e. in a given [x, y] location in a z slice, 20% M1 without M2, 20% M2 without M1, 50% M1 and M2 and 10% empty. As each value is a proportion and the set of values represent the available print material combinations, the set of values in each vector sum to 1 or 100%.

For example, for colored agents, the Mvoc vector may be determined to select agent combinations that generate a match with a supplied object color description. As such, an Mvoc vector may be used as a print instruction and may be used (directly or following processing, for example halftoning) to cause an object generation apparatus to generate the combination of voxels corresponding to the associated color description.

In such examples, an $Mvoc_s$ may characterise a print material combination for a surface voxel, and $Mvoc_{in}$ may characterise a print material combination for an interior voxel n layers deep.

The color mapper 404 may perform a mapping in which an input object color description 408, which may relate to the surface of an object, for example in arbitrary XYZ color space (which may be a device independent color space or any color space such as those referred to as CIE, RGB, sRGB, CYMK, Lab, or the like), maps to an object generation color description 410, in this example defined by a combination of MVocs, as can be represented by:

$$XYZ \rightarrow [Mvoc_s + \Sigma Mvoc_{in}]$$

This may provide a native three dimensional mapping from an object color description, which may be a surface color, to a material volume coverage description with explicit depth and variation towards the interior. It may be that the number n of layers characterised is such that a deeper interior region is not mapped by the color mapper 404. This may be the case in examples where the depth of those voxels and/or the opacity of shallower voxels is such that the visual impact of such voxels is minimal or non-existent.

In examples where the interior voxels are all one color, or have a consistent arrangement, this can be simplified to $$XYZ \rightarrow [Mvoc_s + n*Mvoc_i]$$

In examples where there is one interior voxel, which is either a single color, or has variable behaviour described thereby, then the mapping can be described by:

$$XYZ \rightarrow [Mvoc_s + Mvoc_i]$$

In some examples, the surface voxel and the interior voxel may be characterised by the same print material combination.

Figure 5:
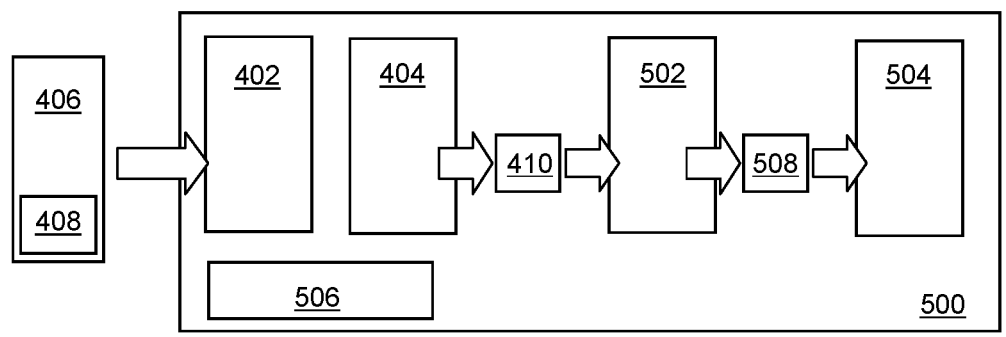
FIG. 5 is a simplified schematic of another example of processing apparatus for mapping object color descriptions to object generation color descriptions.

FIG. 5 is a further example of a processing apparatus 500 comprising an interface 402 and a color mapper 404 as described in relation to FIG. 4. In this example, the processing apparatus further comprises a control data module 502, a print control module 504 and a memory 506.

The control data module 502 generates control data 508 from the object generation color description 410. This data 508 may be used directly to control an object generation apparatus to generate an object. In some examples, generating control data may comprises applying halftoning to at least part of the object generation color description 410. Halftoning may for example comprise comparing a value in a print material coverage representation with a threshold values within a matrix, each threshold value representing a three-dimensional location (for example, an addressable pixel in a plane, or a voxel, or the like) to generate control data for generating a three-dimensional object based on the data 406 representing the object. The control data 508 may for example comprise a set of discrete print material choices for a pixel in a plane, wherein the discrete values across the area of the plane may be representative of proportions set out in a print material coverage representation.

The print control module 504 is to control a three-dimension object generation apparatus to generate a three-dimensional object according to the print instructions, for example using the control data 508. In some examples, the processing apparatus 500 may be in, or in communication with, an object generation apparatus.

The memory 506 in this example stores a color mapping resource associating an object color description 408 with an object generation color description 410. The color mapping resource may be a color mapping resource as described in any of FIGS. 1-3, where the object generation color description 410 comprises at least one print instruction.

Figure 6:
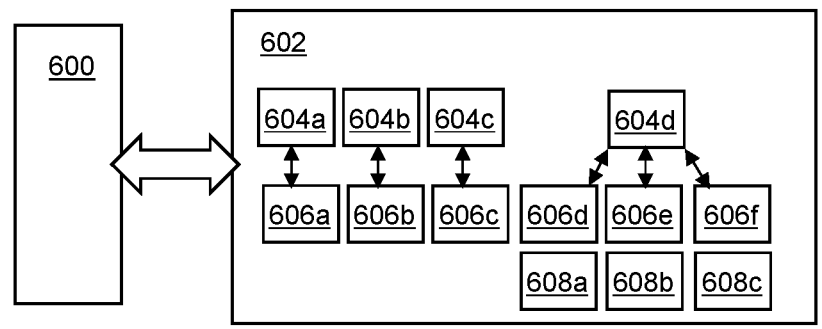
FIG. 6 is a simplified schematic of a processor and a computer readable medium.

FIG. 6 shows a processor 600 associated with a computer readable medium, in this example a memory 602. The memory 602 is for storing data for access by an application program executed by the processor 600. In this example, the data comprises a color mapping resource for use in three-dimensional object generation. The color mapping resource comprises an association between a plurality of appearance descriptions 604a-d and a plurality of print instructions 606a-f.

In an example, the print instructions 606 are for use in causing an object generation apparatus to generate an object having, in at least a portion thereof, a predetermined appearance when viewed from an external view point. In some examples, the print instructions 606 specify a print material combination to be used to generate each of a plurality of voxels, and further specify the depth of each voxel with respect to the surface of an object to be generated. The visual combination of the plurality of voxels once generated so as to have the specified depths and print material combination is intended to impart the object with a predetermined appearance in at least a portion thereof. The print instructions 606 may in some examples comprise control data, or may be processed to provide control data.

In some examples, for a least one appearance description 604d, there is an association with a plurality of print instructions 606d-f, wherein, the color mapping resource comprises, for each association between an appearance description and a print instruction, data 608a-c comprising a representation of at least one physical property of an object generated according to the print instructions. For example, the different print instructions may result in different object strengths, different densities or the like. A particular mapping may be suited to a particular property. Data representing object properties may also be stored in relation to other print instructions, including those with a one to one association with an appearance description 604.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus (such as the processing apparatus 400, 500 or the processor 600 mentioned above) may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage (for example a memory 506 or 602 as described above) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices may realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   determining a plurality of print material combinations for a generation of a 3-dimensional (3D) object, each print material combination having an associated color;
   determining a plurality of color descriptions, for a plurality of combinations of voxels, including:
      selecting interior voxels below a surface of the 3D object that are achromatic, wherein the achromatic interior voxels have black, white, or grey colors,
      grouping surface voxels into groups based on ranges of colors, each group containing surface voxels having colors within a same range of colors,
      combining each of the groups of surface voxels having colors within the same range of colors with at least one of the achromatic interior voxels to generate one of the plurality of combinations of voxels, and
      determining a color description for each of the plurality of combinations of voxels, wherein the color description for each combination of voxels includes one of the print material combinations; and
   defining a color mapping resource, the color mapping resource associating the color descriptions with print instructions, each print instruction being for use in causing an object generation apparatus to generate the combination of voxels corresponding to the associated color description.

2. The method according to claim 1, wherein the color description for each combination of voxels further includes a transparency measurement of the combination of voxels.

3. The method according to claim 1, wherein grouping the surface voxels into groups further comprises selecting surface voxels that have a same predetermined color parameter.

4. The method according to claim 3, wherein the predetermined color parameter comprises a hue, saturation or color gamut region.

5. The method according to claim 1, wherein grouping the surface voxels into groups further comprises selecting surface voxels that have common color descriptions.

6. The method according to claim 1, wherein defining the color mapping resource further includes:
   associating the print instructions with a plurality of object properties for the combinations of voxels.

7. The method according to claim 6, wherein the plurality of object properties for the combinations of voxels include values related to at least one of appearance, conductivity, density, porosity, and strength of the combinations of voxels.

8. The method according to claim 1, defining the color mapping resource comprises:
   associating one of the color descriptions with a plurality of the print instructions, the plurality of print instructions being associated with one of a plurality of object properties.

9. The method according to claim 8, wherein defining the color mapping resource further comprises selecting the plurality of print instructions for inclusion in the color mapping resource based on the associated object property.

10. A computing device comprising:
a processor; and
a memory storing instructions that are executable to cause the processor to:
receive data representing a three-dimensional (3D) object,
determine print material combinations for the 3D object, each print material combination being associated with a color,
from the data representing the 3D object, select interior voxels below a surface of the 3D object that are achromatic, wherein the achromatic interior voxels have black, white, or grey colors,
from the data representing the 3D object, group surface voxels into groups, each group containing surface voxels having colors within a same range of colors,
combine each of the groups of surface voxels with the achromatic interior voxels to generate one of a plurality of combinations of voxels,
determine color descriptions for the plurality of combinations of voxels, wherein one color description is determined for one combination of voxels, and includes one of the print material combinations, and
define a color mapping resource that associates the color descriptions with print instructions, the print instructions being used by an object generation apparatus to generate the 3D object.

11. The computing device according to claim 10, wherein the color description for each combination of voxels further includes a transparency measurement of the combination of voxels.

12. The computing device according to claim 10, wherein the instructions that cause the processor to group the surface voxels into groups include instructions that cause the processor to select surface voxels that have a same color parameter, wherein the color parameter includes a hue, saturation, or color gamut region.

13. The computing device according to claim 10, wherein the instructions are executed to cause the processor to store the color mapping resource in the memory.

14. A non-transitory computer readable medium storing instructions that when executed by a processor cause the processor to:
determine print material combinations for a 3D object, each print material combination being associated with a color;
select interior voxels below a surface of the 3D object that are achromatic, wherein the achromatic interior voxels have black, white, or grey colors;
group surface voxels of the 3D object into groups, each group containing surface voxels having colors within a same range of colors;
combine each of the groups of surface voxels with the achromatic interior voxels to generate one of a plurality of combinations of voxels;
determine color descriptions for the plurality of combinations of voxels, wherein one color description is determined for one combination of voxels, and includes one of the print material combinations, and
define a color mapping resource that associates the color descriptions with print instructions, the print instructions being used by an object generation apparatus to generate the 3D object.

15. The non-transitory computer readable medium according to claim 14, wherein the instructions to define the color mapping resource include instructions that cause the processor to:
associate an appearance description of each of the combinations of voxels with a plurality of the print instructions, and
define data representing a physical property of each of the combinations of voxels according to the plurality of print instructions.

* * * * *